United States Patent
Takaishi

(10) Patent No.: US 7,953,502 B2
(45) Date of Patent: May 31, 2011

(54) POSITION CONTROL METHOD, POSITION CONTROL DEVICE, AND MEDIUM STORAGE DEVICE HAVING DISTURBANCE SUPPRESSION FUNCTION

(75) Inventor: Kazuhiko Takaishi, Tokyo (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/823,365

(22) Filed: Jun. 25, 2010

(65) Prior Publication Data

US 2010/0268354 A1    Oct. 21, 2010

Related U.S. Application Data

(62) Division of application No. 11/789,784, filed on Apr. 25, 2007, now abandoned.

(30) Foreign Application Priority Data

Sep. 12, 2006   (JP) ................. 2006-246451

(51) Int. Cl.
- G05B 13/02   (2006.01)
- G05B 11/01   (2006.01)
- G11B 21/02   (2006.01)
- G11B 5/596   (2006.01)
- G05B 19/18   (2006.01)

(52) U.S. Cl. ......... 700/38; 318/560; 360/75; 360/77.04; 360/78.09; 700/34; 700/37; 700/59

(58) Field of Classification Search .................... 700/34, 700/59, 37, 38, 58; 360/75, 77.04, 78.09; 318/560

See application file for complete search history.

(56) References Cited

U.S. PATENT DOCUMENTS

| | | | |
|---|---|---|---|
| 5,291,190 A * | 3/1994 | Scarola et al. | 340/3.32 |
| 5,404,253 A | 4/1995 | Painter | |
| 5,459,624 A | 10/1995 | Erickson et al. | |
| 5,610,487 A | 3/1997 | Hutsell | |
| 6,169,641 B1 | 1/2001 | Hayner | |
| 6,219,196 B1 | 4/2001 | Semba et al. | |

(Continued)

FOREIGN PATENT DOCUMENTS

EP    1376556 A2 *   1/2004

(Continued)

OTHER PUBLICATIONS

Takaishi et al., "Microactuator Control for Disk Drive", 1996, IEEE Transactions on Magnetics, vol. 32, no.,pp. 1863-1866.*

(Continued)

Primary Examiner — Albert Decady
Assistant Examiner — Thomas Stevens
(74) Attorney, Agent, or Firm — Greer, Buns & Crain, Ltd.

(57) ABSTRACT

In a position control device having a disturbance suppression function, loop gain is calibrated without stopping disturbance suppression control. The position control device has, for disturbance suppression control, a feedback controller for changing the loop characteristic, a table for storing a target gain according to a disturbance frequency, and a gain calibration section for calibrating open loop gain. The gain is calibrated using a target gain in the table according to the change of the loop characteristic of the feedback controller. Open loop gain can be calibrated without interrupting the disturbance suppression control, so the open loop gain can be accurately calibrated without being affected by disturbance, and accurate position control is possible.

6 Claims, 13 Drawing Sheets

U.S. PATENT DOCUMENTS

| | | | |
|---|---|---|---|
| 6,487,028 | B1 | 11/2002 | Sri-Jayantha et al. |
| 6,549,349 | B2 * | 4/2003 | Sri-Jayantha et al. .......... 360/31 |
| 6,636,376 | B1 | 10/2003 | Ho |
| 6,693,764 | B1 | 2/2004 | Sheh et al. |
| 6,760,196 | B1 | 7/2004 | Niu et al. |
| 6,768,607 | B2 | 7/2004 | Ottesen et al. |
| 6,847,503 | B2 | 1/2005 | Zhang et al. |
| 6,937,430 | B2 * | 8/2005 | Ge et al. ...................... 360/78.06 |
| 7,038,876 | B2 | 5/2006 | Morris |
| 7,136,256 | B2 * | 11/2006 | Takaishi et al. ............ 360/78.04 |
| 7,265,934 | B2 * | 9/2007 | Takaishi ..................... 360/77.04 |
| 7,436,616 | B2 * | 10/2008 | Hansen et al. ................. 360/75 |
| 7,443,628 | B2 | 10/2008 | Oyabu |
| 2002/0109932 | A1 | 8/2002 | Aikawa et al. |
| 2003/0128458 | A1 * | 7/2003 | Ge et al. ...................... 360/78.06 |
| 2003/0133218 | A1 * | 7/2003 | Guo et al. ....................... 360/75 |

FOREIGN PATENT DOCUMENTS

| | | |
|---|---|---|
| JP | 7-50075 | 2/1995 |
| JP | 08-167160 | 6/1996 |
| JP | 11-96704 | 4/1999 |
| JP | 11-328891 | 11/1999 |
| JP | 2000-021104 | 1/2000 |

OTHER PUBLICATIONS

Takaishi et al., "Seek and Control and Settling Control Taming Actuator Resonance of Hard Disk Drives", IEEE Transactions of Magnetics, vol, 39, No. 2, pp. 838-843.*

Bickel et al.; "Disturbance Observer Based Hybrid Impedance Control"; Proceedings of the American Control Conference, pp. 729-733; 1995.

Brown L J, et al. "Identification of Periodic Signals With Uncertain Frequency," IEEE Transactions on Signal Processing, IEEE Service Center, New York, NY, US, vol. 51, No. 6, Jun. 2003, pp. 1538-1545, XP001163304, ISSN:1053-587X.

Ehrlich R, et al. "Major HDD TMR Sources and Projected Scaling with TPI," Mar. 1999, IEEE Transactions on Magnetics, IEEE Service Center, New York, NY, US, pp. 885-891, XP011032226, ISSN: 0018-9464.

Nagashima M. et al. "Rejection of Unknown Periodic Disturbances in Magnetic Hard Disk Drives," Asia-Pacific Magnetic Recording Conference, 2006, IEEE, PI, Nov. 2006, pp. 1-2, XP031093287, ISBN: 1-4244-0863-6.

* cited by examiner

| Fdist | TARGET GAIN |
|---|---|
| $Fr_1$ | $TG_1$ |
| ⋮ | ⋮ |
| $Fr_n$ | $TG_n$ |

| Fdist | TARGET GAIN | MEASUREMENT FREQUENCY |
|---|---|---|
| Fr1 | TG1 | fsd |
| ⋮ | ⋮ | ⋮ |
| Frm(=fsd) | TGm | fsd + $\alpha$ |
| ⋮ | ⋮ | ⋮ |
| Frn | TGn | fsd |

30-2

| Fdist | L1 | L2 | L3 | L4 | L5 | a11, | a12, | a21, | a22, | TARGET GAIN |
|---|---|---|---|---|---|---|---|---|---|---|
| Fr×1 | | | | | | | | | | TG 1 |
| Fr×2 | | | | | | | | | | TG 2 |
| ... | | | | | | | | | | ... |
| Fr×N | | | | | | | | | | TGN |
| ... | | | | | | | | | | ... |

30-2

| Fdist | L1 | L2 | L3 | L4 | L5 | a11 | a12 | a21 | a22 | Fcal | TARGET GAIN |
|---|---|---|---|---|---|---|---|---|---|---|---|
| Fr×1 | | | | | | | | | | Fdist+α | G 1 |
| Fr×2 | | | | | | | | | | Fdist+α | G 2 |
| ... | | | | | | | | | | | ... |
| Fr×N | | | | | | | | | | Fdist+α | GN |
| ... | | | | | | | | | | ... | ... |

| Fdist | L1 | L2 | L3 | L4 | L5 | Ad11 | Ad12 | Ad21 | Ad22 | Fcal | Gcal |
|---|---|---|---|---|---|---|---|---|---|---|---|
| Fr×1 | | | | | | | | | | fsd+α | G1 |
| Fr×2 | | | | | | | | | | 〃 | G2 |
| ... | | | | | | | | | | 〃 | |
| Fr×K(=fsd) | | | | | | | | | | fsd+α | GK1 |
| Fr×K | | | | | | | | | | fsd−α | GK2 |
| ... | | | | | | | | | | 〃 | |
| Fr×N | | | | | | | | | | 〃 | GN |
| ... | | | | | | | | | | 〃 | |

POSITION CONTROL METHOD, POSITION CONTROL DEVICE, AND MEDIUM STORAGE DEVICE HAVING DISTURBANCE SUPPRESSION FUNCTION

CROSS-REFERENCE TO RELATED APPLICATIONS

This is a divisional of application Ser. No. 11/789,784, filed Apr. 25, 2007.

This application is based upon and claims the benefit of priority from the prior Japanese Patent Application No. 2006-246451, filed on Sep. 12, 2006, the entire contents of which are incorporated herein by reference.

BACKGROUND OF THE INVENTION

1. Field of the Invention

The present invention relates to a position control method, position control device and medium storage device for controlling the position of an object by suppressing disturbance, and more particularly to a position control method, position control device, and medium storage device for suppressing the position deviation of an object due to disturbance.

2. Description of the Related Art

A position control device is for controlling the position of an object to a specified position and is widely used in various fields. For example, in a medium storage device, such as a magnetic disk device and an optical disk device, it is extremely critical to accurately position the head to a target track to improve recording density.

In this position control, it is known that disturbance affects positioning accuracy. In order to suppress this disturbance by a control system, a method of installing a filter for suppressing specific frequencies (e.g. see U.S. Pat. No. 6,487,028 B1, R. J. Bickel and M. Tomizuka: "Disturbance observer based hybrid impedance control", (Proceedings of the American Control Conference, 1995, pp. 729-733)), and a method of suppressing such disturbance as eccentricity by observer control (e.g. see Japanese Patent Application Laid-Open No. H7-50075 and Japanese Patent Application Laid-Open No. 2000-21104) have been proposed.

On the other hand, in order for the positioning control system to operate accurately, calibration of gain of open loop characteristics (open loop gain) is indispensable. The open loop gain changes if the characteristics of elements constituting a feedback loop change (e.g. temperature, age-based deterioration). Always maintaining this open loop gain at an optimum contributes to the performance of the feedback loop. This calibration is performed when the power of a device is turned ON, when temperature is changed, or when a predetermined time elapsed, for example, so as to calibrate the open loop gain at an optimum.

As a method for calibrating a gain, applying a sine wave disturbance to a position or current and acquiring and comparing waveforms before and after applying the sine wave disturbance so as to measure the gain of the open loop characteristic is known (e.g. see Japanese Patent Application Laid-Open No. H11-328891, Japanese Patent Application Laid-Open No. H8-167160, and Japanese Patent Application Laid-Open No. H11-96704).

In the case of this conventional gain calibration method, a target gain of the loop characteristic for adjusting the gain and a sine wave disturbance frequency for adjusting the gain are fixed values. In other words, in the case of the conventional gain calibration method, gain is calibrated assuming that the position control system has only one type of characteristic during gain adjustment.

However in the case of a position control system with a disturbance suppression function, the characteristics of the position control system change according to the disturbance frequency to be suppressed. For example, in a control system using adaptive control, the loop characteristic of the control system is different from that before disturbance is applied, when the position control system is following up disturbance based on the adaptive control in a state of applied disturbance vibration.

In order to execute gain adjustment while this adaptive control is following up disturbance, it is necessary to stop the adaptive control and switch to the control system for gain adjustment. In this case, the external vibrations cannot be sufficiently suppressed and positioning accuracy drops since the adaptive control is stopped. As a result, accuracy of gain adjustment drops.

In other words, in the case of such a position control system as an adaptive control system, disturbance is suppressed by changing the loop characteristic according to disturbance, so it is difficult to accurately calibrate the open loop gain of the control system using prior art. Particularly if suppression width is taken wide or if disturbance in a high frequency area is suppressed to meet the recent demand for adapting a wide range of disturbance frequencies, the original characteristics of the controller are influenced, so it is more difficult to calibrate gain accurately.

SUMMARY OF THE INVENTION

With the foregoing in view, it is an object of the present invention to provide a position control method, position control device, and medium storage device for accurately calibrating the open loop gain in a position control system using the disturbance adaptive control.

It is another object of the present invention to provide a position control method, position control device, and medium storage device for accurately calibrating the open loop gain even while disturbance is being applied.

It is still another object of the present invention to provide a position control method, position control device, and medium storage device for accurately calibrating the open loop gain, even if the disturbance suppression frequency is set from the outside.

It is still another object of the present invention to provide a position control method, position control device, and medium storage device for accurately calibrating the open loop gain, even if the position control system adapts to disturbance suppression frequencies in a wide range.

A position control method according to the present invention is a position control method for controlling a position of an object to a predetermined position by an actuator. The method has steps as follows: a step of computing a position error based on a target position of the object and a current position of the object; and a step of computing a control value in which a disturbance frequency component is suppressed, using a predetermined feedback loop based on the position error, and multiplying the result by a loop gain, so as to compute a drive value of the actuator. Additional steps of the method are a step of fetching a target loop gain according to the disturbance frequency from a table and a step of adding the disturbance of a measurement frequency to the feedback loop and measuring a loop gain of the feedback loop. The method also has a step of calibrating the loop gain of the control value computing step based on the measured loop gain and the target loop gain.

A position control device for controlling a position of an object to a predetermined position by an actuator according to the present invention has a control section for computing a position error based on a target position of the object and a current position of the object, computing a control value in which a disturbance frequency component is suppressed, using a predetermined feedback loop based on the position error, and multiplying the result by a loop gain, so as to compute a drive value of the actuator. Also included is a table for storing a target loop gain according to the disturbance frequency, wherein the control section fetches the target loop gain according to the disturbance frequency from the table, adds the disturbance of a measurement frequency to the feedback loop, measures a loop gain of the feedback loop, and calibrates the loop gain in the control value computing step based on the measured loop gain and the target loop gain.

A medium storage device according to the present invention has a head for at least reading data on a storage medium, and an actuator for positioning the head to a predetermined position on the storage medium. The medium storage device also has a control section for computing a position error based on a target position of the head and a current position acquired from the head, computing a control value in which a disturbance frequency component is suppressed, using a predetermined feedback loop based on the position error, and multiplying the result by a loop gain, so as to compute a drive value of the actuator. Further included is a table for storing a target loop gain according to the disturbance frequency, wherein the control section fetches the target loop gain according to the disturbance frequency from the table, adds the disturbance of a measurement frequency to the feedback loop, measures a loop gain of the feedback loop, and calibrates the loop gain in the control value computing step based on the measured loop gain and the target loop gain.

In the present invention, it is preferable that the step of fetching the target loop gain further has a step of fetching a measurement frequency according to the disturbance frequency, and the measurement step further has a step of adding the disturbance of the fetched measurement frequency to the feedback loop and measuring a loop gain of the feedback loop.

Also in the present invention, it is preferable that the step of fetching the measurement frequency further has a step of fetching a measurement frequency which does not overlap with the disturbance frequency.

Also in the present invention, it is preferable that the drive value computing step further has a step of estimating the disturbance frequency according to the position error based on an adaptive control, computing a control value in which the disturbance frequency component is suppressed, according to the estimated disturbance frequency, and multiplying the result by a loop gain, so as to compute a drive value of the actuator.

It is also preferable that the present invention further has a step of interrupting the estimation of the disturbance frequency according to the position error during calibration of the loop gain.

Also in the present invention, it is preferable that the drive value computing step further has a step of estimating the disturbance frequency according to the position error based on an adaptive control, and changing a constant of a controller according to the estimated disturbance frequency, and a step of computing a control value in which the disturbance frequency component is suppressed, using the changed controller according to the position error, and multiplying the result by a loop gain so as to compute a drive value of the actuator.

Also in the present invention, it is preferable that the drive value computing step further has a step of estimating the disturbance frequency according to the position error based on an adaptive control, and changing a constant of a controller constructed with an observer according to the estimated disturbance frequency, and a computing step of computing a control value in which the disturbance frequency component is suppressed, according to the position error using the changed observer, and multiplying the result by a loop gain, so as to compute a drive value of the actuator.

Because of disturbance suppression control, open loop gain is calibrated using a target gain according to a disturbance frequency, even if a loop characteristic of a feedback controller changes, so the open loop gain can be calibrated without interrupting the disturbance suppression control. Therefore the open loop gain can be accurately calibrated without being affected by disturbance, and accurate position control is possible.

DESCRIPTION OF THE PREFERRED EMBODIMENTS

Embodiments of the present invention will now be described in the sequence of the position control device, first embodiment of the position control device, loop gain calibration processing, second embodiment, third embodiment, design of disturbance observer, fourth embodiment, fifth embodiment, and other embodiments, but the present invention is not limited to these embodiments.

Position Control Device

Figure 1:
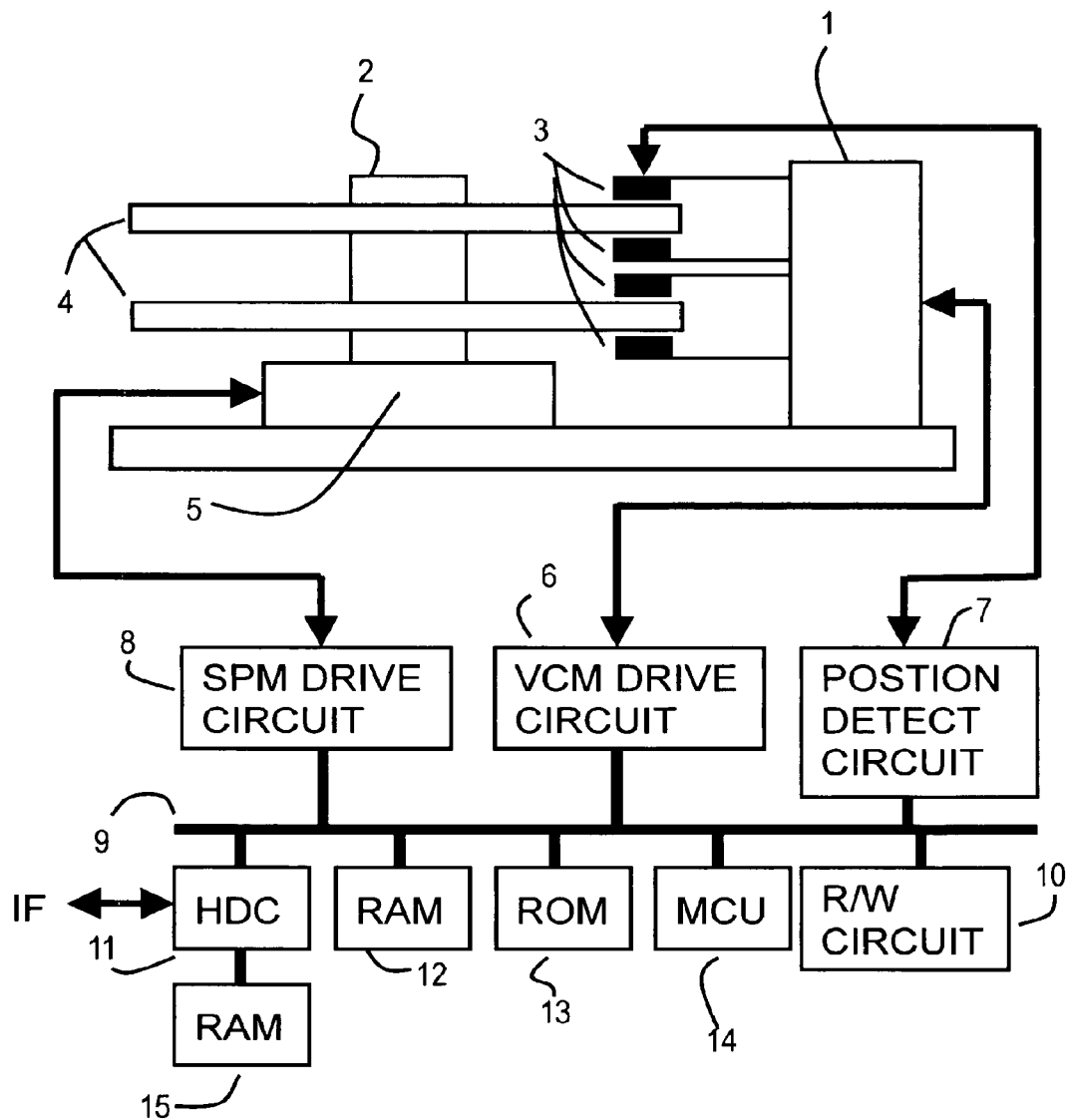
FIG. 1 is a block diagram depicting a medium storage device according to an embodiment of the present invention.
Figure 2:
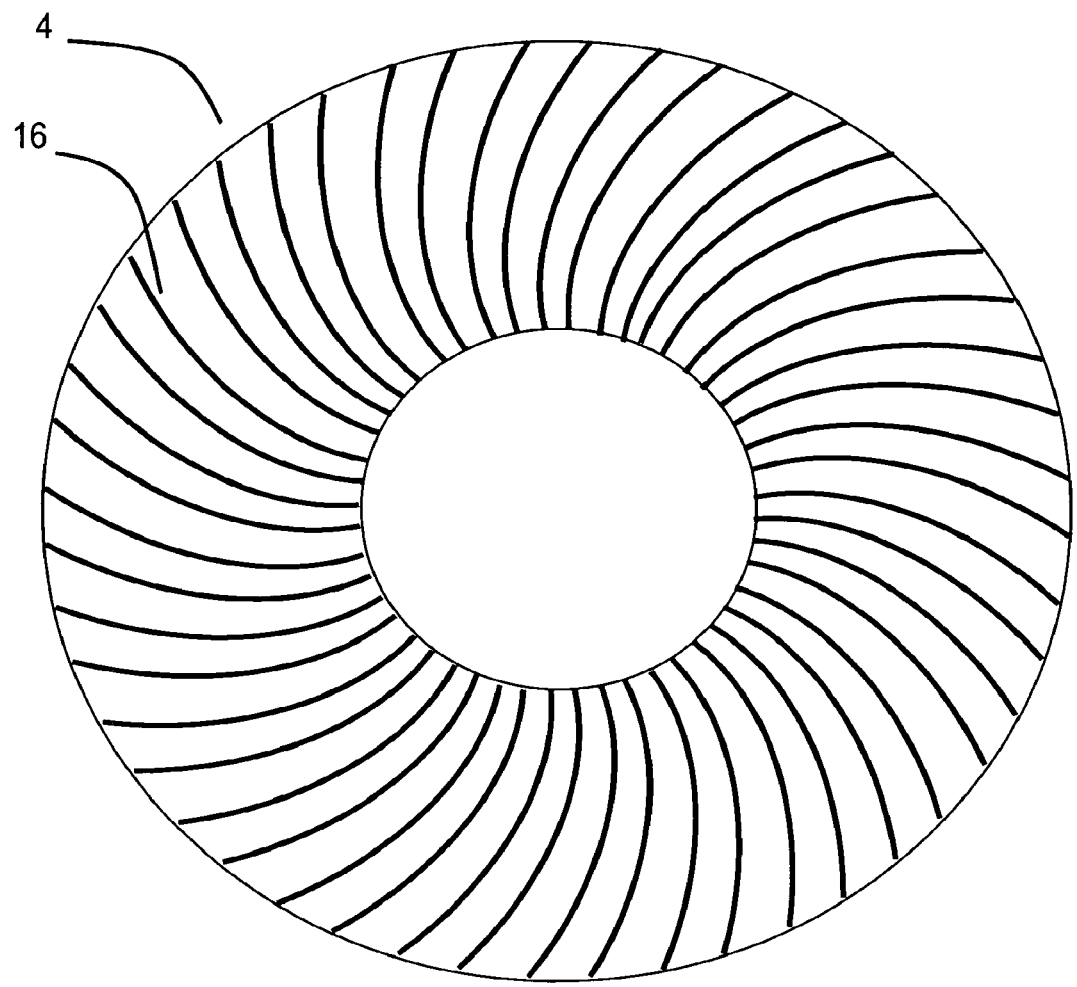
FIG. 2 is a diagram depicting the position signals of the medium storage device in FIG. 1.
Figure 3:
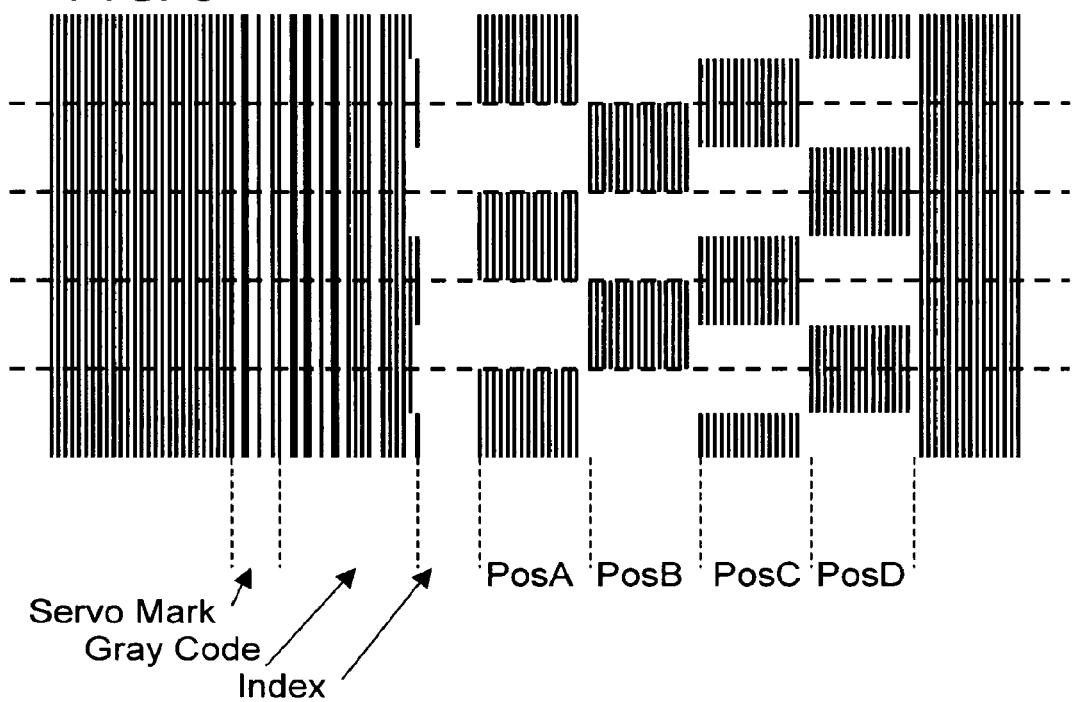
FIG. 3 is a diagram depicting details of the position signals in FIG. 2.

FIG. 1 is a block diagram depicting the position control device according to an embodiment of the present invention, FIG. 2 is a diagram depicting the arrangement of the position signals of the magnetic disk in FIG. 1, and FIG. 3 is a diagram depicting the position signals of the magnetic disk in FIG. 1 and FIG. 2.

FIG. 1 shows a magnetic disk device, which is a type of disk device, as a position control device. As FIG. 1 shows, in a magnetic disk device, a magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1.

The magnetic head 3 is a separation type magnetic head which has a read element and a write element. The magnetic head 3 is comprised of a read element, including a magneto-resistance (MR) element, stacked on a slider, and a write element, including a write coil, stacked thereon.

A position detection circuit 7 converts the position signals (analog signals) read by the magnetic head 3 into digital signals. A read/write (R/W) circuit 10 controls the reading and writing of the magnetic head 3. A spindle motor (SPM) device circuit 8 drives the spindle motor 5. A voice coil motor (VCM) drive circuit 6 supplies drive current to the voice coil motor (VCM) 1, and drives the VCM 1.

A microcontroller (MCU) 14 detects (demodulates) the current position from the digital position signals from the position detection circuit 7, and computes a VCM drive command value according to an error between the detected current position and a target position. In other words, the microcontroller 14 performs position demodulation and servo control, including the disturbance suppression described in FIG. 4 and later. A read only memory (ROM) 13 stores a control program of the MCU 14. A random access memory (RAM) 12 stores data for processing of the MCU 14.

A hard disk controller (HDC) 11 judges a position in one track based on a sector number of a servo signal, and records/reproduces the data. A random access memory (RAM) for buffer 15 temporarily stores the read data or write data. The HDC 11 communicates with a host via an interface IF, such as USB, ATA and SCSI. A bus 9 connects these composing elements.

As FIG. 2 shows, on the magnetic disk 4, servo signals (position signals) 16 are arrayed in each track in the circumferential direction from the outer circumference to the inner circumference with an equal interval. Each track has a plurality of sectors, and the solid lines in FIG. 2 indicate positions where the servo signals 16 are recorded. As FIG. 3 shows, the position signal is comprised of a servo mark ServoMark, track number GrayCode, index Index, and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signals is used as a reference when data is recorded/reproduced. There is one index signal in one track. The sector number may be set instead of the index signal.

The MCU 14 in FIG. 1 confirms the position of the actuator 1 through the position detection circuit 7, performs servo computation, and supplies appropriate current to the VCM 1. In other words, in seek control, the head is moved to the target position through the transition from coarse control, settling control and following control. For all these controls, the current position of the head must be detected.

To confirm the position like this, the servo signals are recorded on the magnetic disk in advance, as mentioned in FIG. 2. In other words, as FIG. 3 shows, servo marks which indicate the start position of the servo signal, gray code which indicates the track number, index signal, and signals PosA to PosD which indicate the offset are recorded on the magnetic disk in advance. These signals are read by the magnetic head, and these servo signals are converted into digital values by the position detection circuit 7.

First Embodiment of Position Control System

Figures 4, 5:
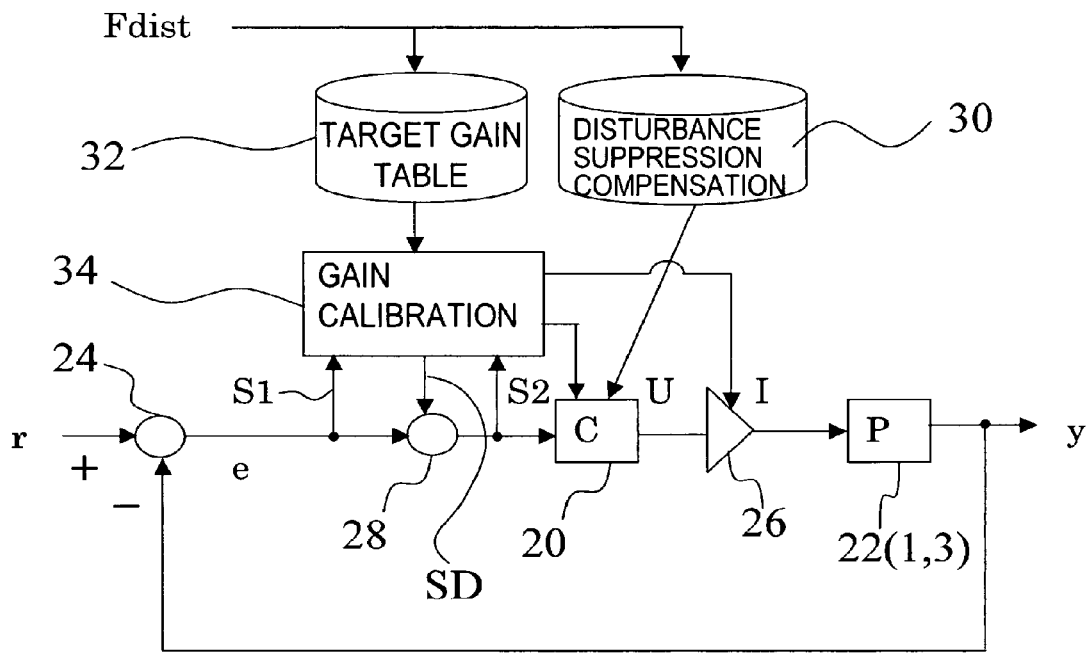
FIG. 4 is a block diagram depicting a position control system according to the first embodiment of the present invention.
FIG. 5 shows a target gain table in FIG. 4.
Figure 6:
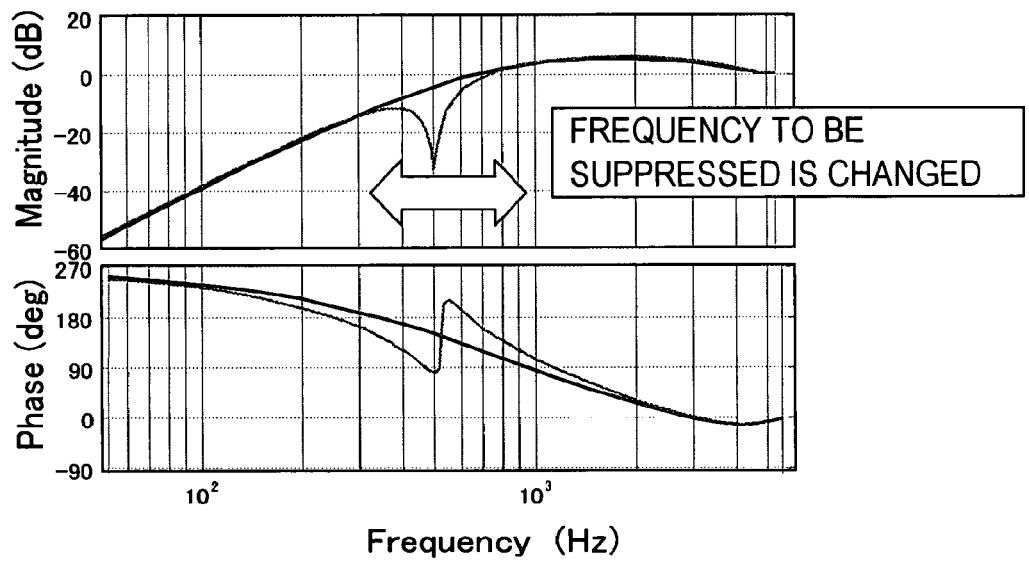
FIG. 6 is a characteristic diagram of the sensitivity function of the feedback loop in FIG. 4.
Figure 7:
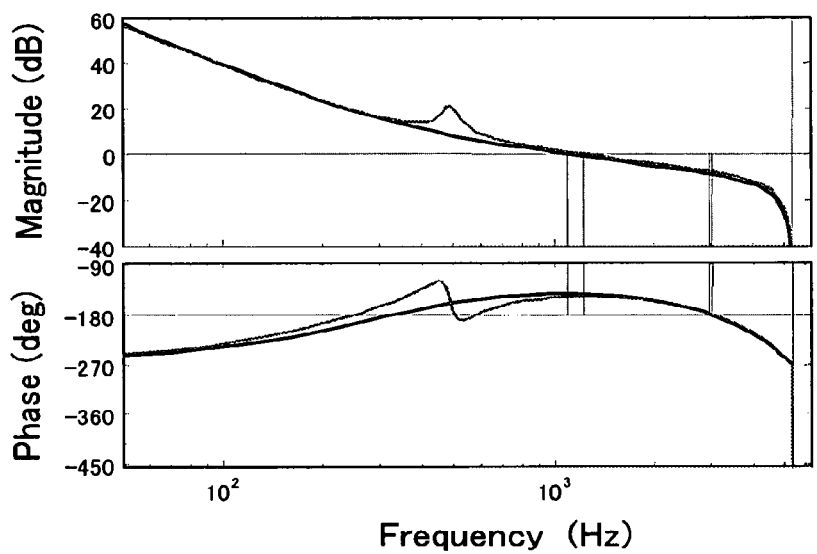
FIG. 7 is an open loop characteristic diagram of the feedback loop in FIG. 4.

FIG. 4 is a block diagram depicting a first embodiment of the position control system of the present invention, and is a block diagram of a position control system for suppressing disturbance which the MCU 14 in FIG. 1 executes. FIG. 5 shows the target gain table in FIG. 4, and FIG. 6 and FIG. 7 are characteristic diagrams of the disturbance adaptive control in FIG. 4.

The position control system in FIG. 4 controls a disturbance suppression compensation function of a controller which is set from the outside, or according to a detected disturbance frequency Fdist. A gain adjustment function is added to this position control system. An error computing block 24 subtracts an observation position (current position) 'y' from a target position 'r' to compute a position error 'e'.

According to the position error 'e', a controller 20 computes a drive instruction value 'u' of a plant 22 (1, 3) to make the position error 'e'. The controller 20 computes the drive instruction value 'u' by a known PID control, PI control+ LeadLag, and observer control, for example.

A gain multiplication block 26 multiplies the drive instruction value 'u' from the controller 20 by a gain which is set (open loop gain), and outputs the result. A power amplifier, which is not illustrated, converts this output to a drive current I of the plant 22 (1, 3), and drives the plant 22 (1, 3).

A disturbance suppression compensation block 30 changes a characteristic (e.g. constant) of the controller 20 according to a disturbance suppression frequency which is set from the outside, or an estimated disturbance frequency Fdist, and adds a disturbance frequency suppression characteristic by the controller 20. This suppression characteristic will be described using the sensitivity function (1/(1+CP)) and open loop characteristic (CP). C is a characteristic of a controller, and P is a characteristic of a plant.

FIG. 6 shows an example of the frequency characteristic of a sensitivity function of the position control system, where a frequency (Hz) vs. gain characteristic (dB) is shown on the top, and a frequency (Hz) vs. phase characteristic (deg) is shown at the bottom of FIG. 6. As FIG. 6 shows, the sensitivity function is changed as shown in the thin line from the original characteristic of the controller which is shown in the thick line, according to the frequency to be suppressed. Here the sensitivity function in the case of suppressing a 500 Hz disturbance frequency is shown.

FIG. 7 shows an example of a frequency characteristic of the open loop characteristic of the position control system corresponding to FIG. 6, where a frequency (Hz) vs. gain characteristic (dB) is shown on the top, and a frequency (Hz) vs. phase characteristic (deg) is shown at the bottom of FIG. 7. As FIG. 7 shows, the open loop characteristic is changed as shown in the thin line from the original characteristic of the controller which is shown in the thick line, according to the frequency to be suppressed. Here the open loop characteristic in the case of suppressing a 500 Hz disturbance frequency is shown.

A controller 20 which implements this sensitivity function or open loop characteristic for suppressing a specific disturbance frequency will be concretely described in FIG. 12 or later.

Back in FIG. 4, a gain calibration block 34 applies a sine wave disturbance SD having a predetermined frequency according to a gain calibration instruction, detects signals in a loop before and after applying the sine wave disturbance, and calibrates a gain in the gain multiplication block 26. In FIG. 4, a sine wave disturbance SD for measurement is applied from an addition block 28 to a feedback loop according to a position (position error) which is an input of the controller 20, and position errors before and after applying the sine wave disturbance are observed. A target gain table 32 stores a target gain G corresponding to a disturbance frequency Fdist, supplies the target gain G corresponding to the disturbance frequency Fdist to the gain calibration block 34, and uses it as a reference of the gain calibration in the gain calibration block 34.

This target gain table 34 stores target gains TG1, TG2, ..., TGnwo for each disturbance frequency Fdist, as shown in FIG. 5. This target gain is decided corresponding to the loop characteristic, which changes by the disturbance suppression control, as described in FIG. 6 and FIG. 7.

Gain Calibration Processing

Figure 8:
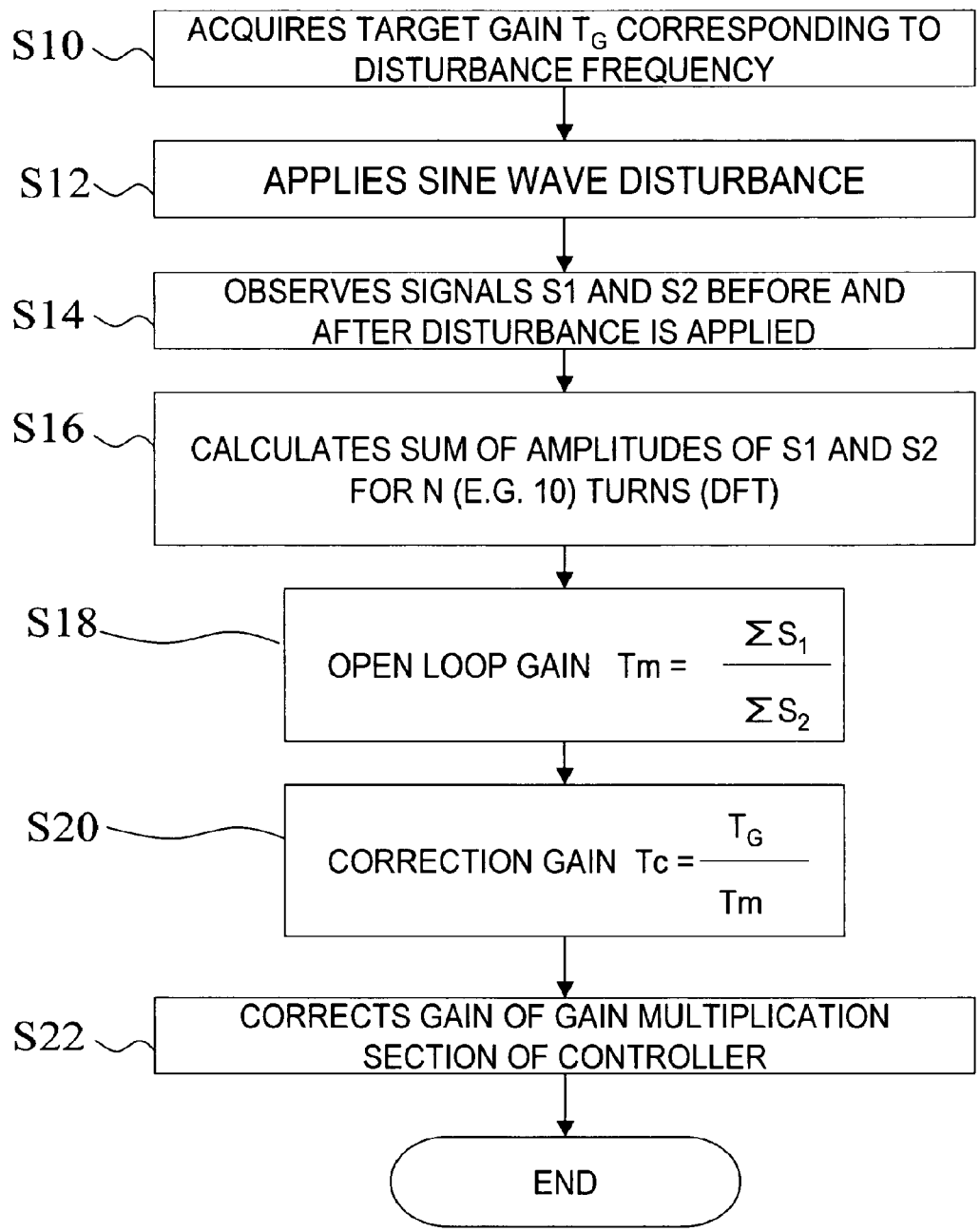
FIG. 8 is a flow chart depicting the gain calibration processing of the gain calibration block in FIG. 4.
Figure 9:
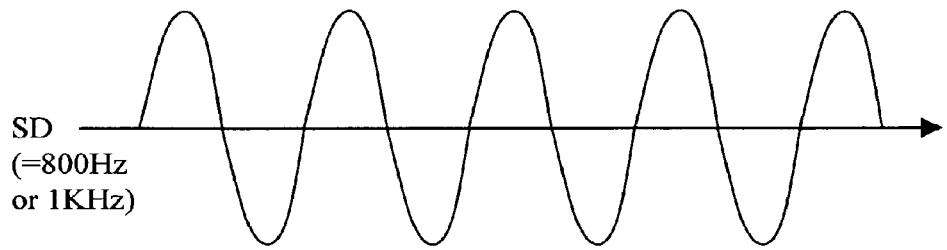
FIG. 9 is a diagram depicting the sine wave disturbance of the gain calibration processing in FIG. 8.

Now the calibration processing of the gain calibration block 34 will be described. FIG. 8 is a flow chart depicting the gain calibration processing which the gain calibration block 34 executes, and FIG. 9 is a diagram depicting the sine wave disturbance thereof.

(S10) The gain calibration block 34 acquires a target gain TG corresponding to a disturbance frequency from the target gain table 34.

(S12) The gain calibration block 34 applies a sine wave disturbance SD to the addition block 28. FIG. 9 shows an example of a waveform of a sine wave disturbance SD to be applied, and a sine wave at 800 Hz, for example, is used.

(S14) The gain calibration block 34 observes signals S1 and S2 before and after the disturbance is applied. In FIG. 4, the input stage of the addition block 28 is observed (acquired) as a signal (position error) S1 before the disturbance is applied, and the output stage of the addition block 28 as a signal (position error) S2 after the disturbance is applied.

(S16) The gain calibration block 34 performs DFT (Digital Fourier Transfer) operation on each of the observed signals S1 and S2, so as to determine the level (amplitude) of each signal S1 and S2. This is repeated for N number of turns of the disk (e.g. 10 turns), and the sums thereof $\Sigma S1$ and $\Sigma S2$ are calculated.

(S18) The gain calibration block 34 divides the sum of the amplitudes of the signals S1 before the disturbance is applied, that is $\Sigma S1$, by the sum of the amplitudes of the signals S2 after the disturbance is applied, that is $\Sigma S2$, so as to calculate an open loop gain Tm.

(S20) Then the gain calibration block 34 calculates a correction gain Tc by dividing the target gain TG corresponding to the disturbance frequency, which is acquired in step S10, by the measured open loop gain Tm.

(S22) The gain calibration block 34 sets this correction gain Tc in the gain calibration block 26, and ends the calibration.

It is desirable to set this target gain TG for each disturbance frequency, but this increases the memory capacity of the target gain memory 32. Therefore as FIG. 5 shows, the table 32 may store the target gain TG at a multiple of Fr (e.g. rotation frequency), so that for disturbance frequencies between these multiple frequencies, a target gain corresponding to the disturbance frequency Fr is calculated by interpolation.

By suppressing disturbance like this, the open loop gain is calibrated using a target gain according to the disturbance frequency, so the open loop gain can be calibrated without interrupting disturbance suppression control, even if the loop characteristic of the controller 20 is changed. Therefore the open loop gain can be accurately calibrated without being affected by the disturbance.

Second Embodiment of Position Control System

Figure 10:
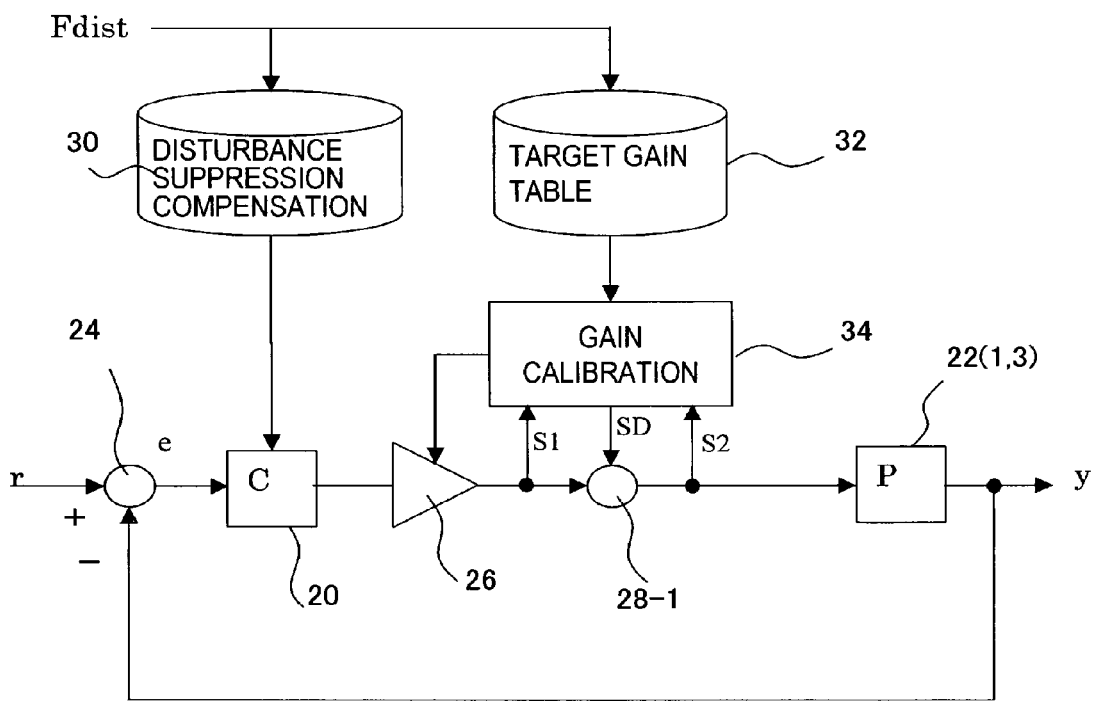
FIG. 10 is a block diagram depicting a position control system according to the second embodiment of the present invention.

FIG. 10 is a block diagram depicting a second embodiment of the position control system of the present invention. In FIG. 10, composing elements the same as those in FIG. 4 are denoted with the same reference symbols.

Just like FIG. 4, an error computing block 24 subtracts an observation position (current position) y from the target position r to compute a position error e. A controller 20 computes, according to position the error e, a drive instruction value u of a plant 22 (1, 3) to make the position error e zero. The controller 20 computes the drive instruction value u by a known PID control, PI control+LeadLag, and observer control, for example.

A gain multiplication block 26 multiplies the drive instruction value u from the controller 20 by a gain which is set (open loop gain), and outputs the result. A power amplifier, which is not illustrated, converts this output into a drive current I of the plant 22 (1, 3), and drives the plant 22 (1, 3).

A disturbance suppression compensation block 30 changes the characteristic (e.g. constant) of the controller 20 according to a disturbance suppression frequency which is set from the outside, or an estimated disturbance frequency Fdist, and adds a disturbance frequency suppression characteristic by the controller 20.

A gain calibration block 34 applies a sine wave disturbance SD having a predetermined frequency according to a gain calibration instruction, detects signals in a loop before and after applying the sine wave disturbance, and calibrates a gain in the gain multiplication block 26. In FIG. 11, a sine wave disturbance SD for measurement is applied from an addition block 28-1 to a feedback loop according to a current level (drive instruction value) which is an output of the controller, and currents before and after applying the sine wave disturbance are observed. A target gain table 32 stores a target gain G corresponding to a disturbance frequency Fdist, supplies the target gain G corresponding to the disturbance frequency Fdist to the gain calibration block 34, and uses it as a reference of the gain calibration in the gain calibration block 34.

This target gain table 34 stores target gains TG1, TG2, ..., TGn for each disturbance frequency Fdist, as shown in FIG. 5 or FIG. 10. This target gain is decided corresponding to the loop characteristic, which changes by the disturbance suppression control, as described in FIG. 6 and FIG. 7.

This gain calibration processing is the same as FIG. 8, except that the observation target is the current level of the output stage. In this way, gain can be calibrated also by observing the current level.

Figures 11, 12:
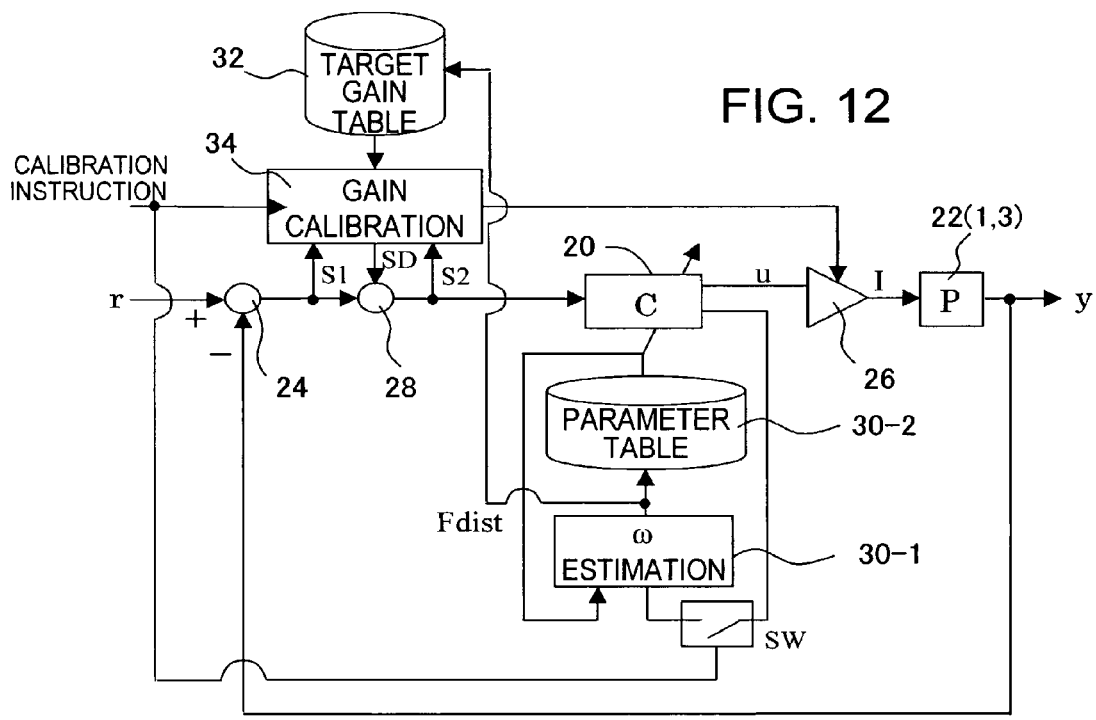
FIG. 11 shows a target gain table of the embodiment in FIG. 10.
FIG. 12 is a block diagram depicting a position control system according to the third embodiment of the present invention.

FIG. 11 shows another target gain table. Compared with the table 32 in FIG. 5, this table 32-1 has a measurement frequency column in addition to the target gain, for each disturbance frequency Fdist. In other words, the measurement frequency can also be changed according to the disturbance frequency Fdist.

Here if the disturbance frequency Fdist is a predetermined measurement frequency fsd, the measurement frequency is changed to fsd+α (α≠0). In other words, applying a measurement frequency the same as a disturbance frequency to the control system as a disturbance while the position control system is controlling disturbance suppression means that the disturbance frequency is supplied into the loop while suppressing the same disturbance frequency.

Therefore the sine wave disturbance of the measurement frequency is also suppressed by the disturbance suppression function, and accurate open loop gain cannot be measured. So the measurement frequency is shifted so as not to overlap with the disturbance frequency, then the open loop gain can be accurately measured.

The table 32-1 in FIG. 11 can also be applied to the first embodiment in FIG. 4.

Third Embodiment

Figure 13:
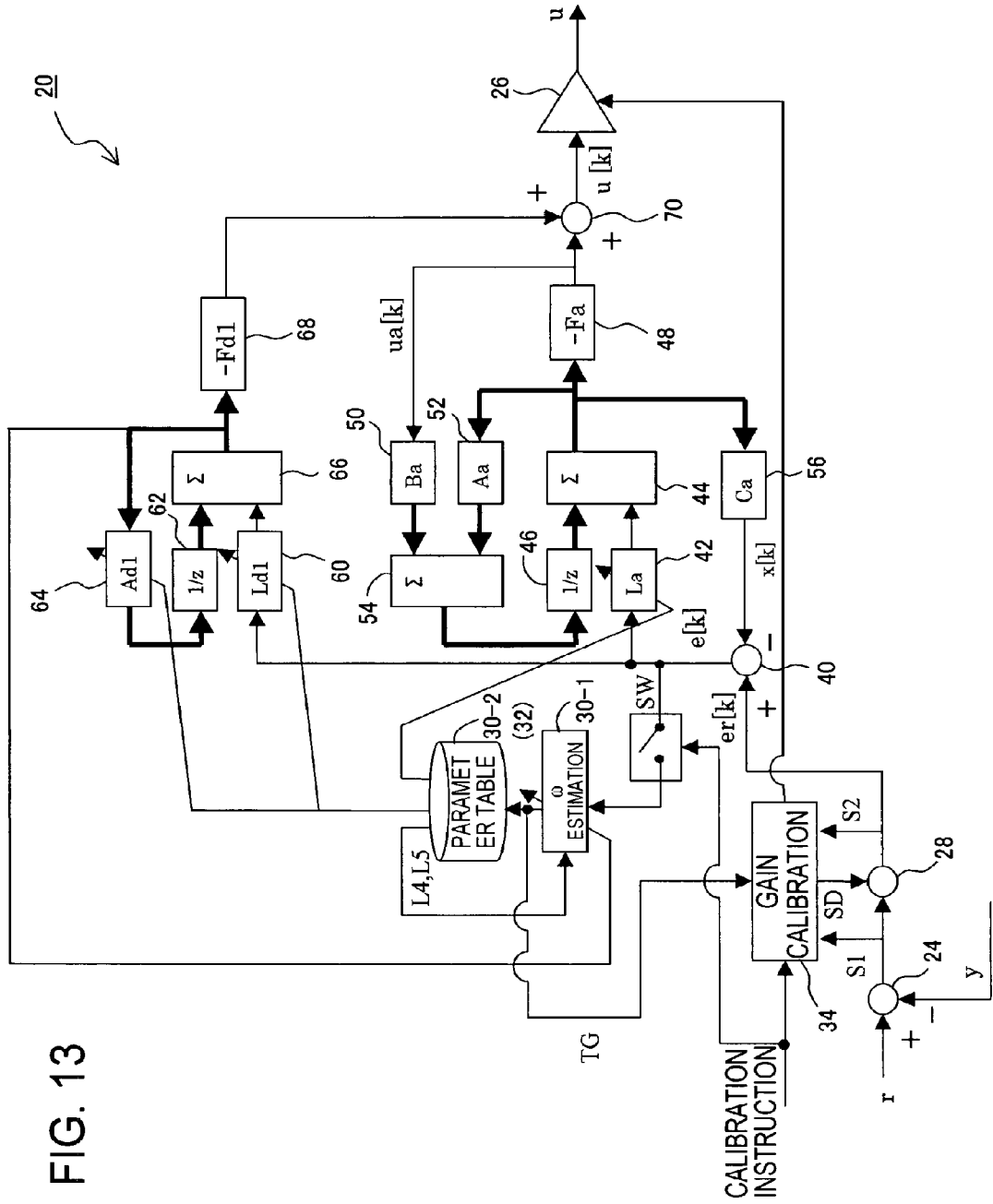
FIG. 13 is a block diagram depicting an embodiment where the controller in FIG. 12 is constructed with a current observer.
Figures 14, 15, 16:
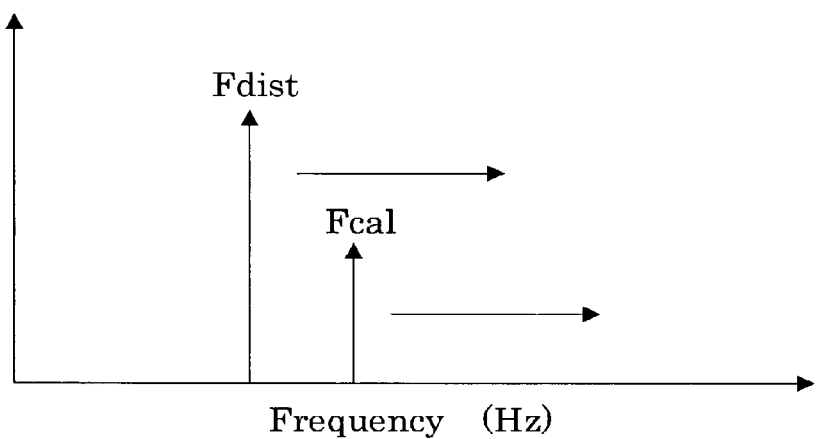
FIG. 14 shows a parameter table of the embodiment in FIG. 13.
FIG. 15 shows another parameter table of the embodiment in FIG. 13.
FIG. 16 is a diagram depicting a measurement frequency in the parameter table in FIG. 15.

FIG. 12 is a block diagram depicting a third embodiment of the position control system of the present invention, FIG. 13 is a block diagram when the control system in FIG. 12 is constructed with a current observer, and FIG. 14 is the parameter table in FIG. 13.

FIG. 12 shows a position control system for detecting a disturbance frequency and suppressing the disturbance by adaptive control, and in FIG. 12, composing elements the same as those in FIG. 4 are denoted with the same reference symbols.

In other words, an error computing block 24 subtracts an observation position (current position) 'y' from a target position 'r' to compute a position error 'e'. According to the position error 'e', a controller 20 computes a drive instruction value 'u' of a plant 22 (1, 3) to make the position error e zero. The controller 20 computes the drive instruction value 'u' by an observer control to be described later in FIG. 13, for example.

A gain multiplication block 26 multiplies the drive instruction value 'u' from the controller 20 by a gain which is set (open loop gain), and outputs the result. A power amplifier, which is not illustrated, converts this output into a drive current I of the plant 22 (1, 3), and drives the plant 22 (1, 3).

A disturbance suppression compensation block 30 is comprised of an external suppression adaptive control system.

This adaptive control system has a ω estimation section 30-1 for estimating a disturbance frequency Fdist (ω) according to an adaptive rule based on the position error of the controller 20, and a table 30-2 for storing estimated gains L and A of the controller 20 according to an estimated frequency (angular frequency ω in this case).

A gain calibration block 34 applies a sine wave disturbance SD having a predetermined frequency according to a gain calibration instruction, detects signals in a loop before and after applying the sine wave disturbance, and calibrates a gain in the gain multiplication block 26. In FIG. 12, a sine wave disturbance SD for measurement is applied from the addition block 28 to a feedback loop according to a position which is an input of the controller, and positions before and after applying the sine wave disturbance are observed.

A target gain table 32 stores a target gain G corresponding to a disturbance frequency Fdist, supplies the target gain G corresponding to the disturbance frequency Fdist from the ω estimation section 30-1 to the gain calibration block 34, and uses it as a reference of the gain calibration in the gain calibration block 34.

The present embodiment also has a switch SW for stopping the input of a position error of the controller 20 to the ω estimation section 30-1 during gain calibration. By this, the ω estimation section 30-1 maintains the estimated disturbance frequency before starting gain calibration during gain calibration. Therefore during gain calibration, the disturbance suppression control is executed, but adaptive control is interrupted so that unnecessary adaptive control is not performed by a sine wave disturbance for measuring the gain.

In the present embodiment, the characteristic (e.g. constant) of the controller 20 is changed according to an estimated disturbance frequency Fdist, and the disturbance frequency suppression characteristic is added by the controller 20.

The present embodiment will be described in more detail using the controller 20 based on a current observer in FIG. 13. In FIG. 13, composing elements the same as those in FIG. 12 are shown with the same reference symbols. The current observer shown in FIG. 13 is a current observer which includes bias compensation shown in the following Expressions (1), (2), (3), (4) and (5).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \quad (1)$$

$$u(k) = -(F1 \ F2)\begin{pmatrix} x(k) \\ v(k) \end{pmatrix} \quad (2)$$

$$uout(k) = u(k) - (F3 \ F4 \ F5)\begin{pmatrix} b(k) \\ z1(k) \\ z2(k) \end{pmatrix} \quad (3)$$

$$\begin{pmatrix} x(k+1) \\ v(k+1) \end{pmatrix} = \begin{pmatrix} 1 & 1 \\ 0 & 1 \end{pmatrix}\begin{pmatrix} x(k) \\ v(k) \end{pmatrix} + \frac{Bl}{m}\frac{1}{Lp}T^2\begin{pmatrix} 1/2 \\ 1 \end{pmatrix} u(k) \quad (4)$$

$$\left. \begin{array}{l} b(k+1) = b(k) \\ \begin{pmatrix} z1(k+1) \\ z2(k+1) \end{pmatrix} = \begin{pmatrix} a11 & a12 \\ a21 & a22 \end{pmatrix}\begin{pmatrix} z1(k) \\ z2(k) \end{pmatrix} \end{array} \right\} \quad (5)$$

In other words, this embodiment is an example of an adaptive control system where the controller 20 is separated into a model of the controller and a disturbance model.

In FIG. 13, a first computing block 24 computes an actual position error er[k] by subtracting a target position 'r' from an observation position y[k] which is acquired by demodulating the servo information read by the head 3. A second computing block 40 computes an estimated position error e[k] by subtracting an estimated position x[k] of the observer from the actual position error er[k].

In the controller model, this estimated position error e[k] is input to a state estimation block 42, and an estimated correction value (right hand side of Expression (1)) is computed using an estimated gain La (L1, L2) of the controller. And in the addition block 44, the result is added with state quantities (left hand side of Expression (1)) x[k] and v[k] from the delay block 46, and estimated position x[k] and estimated velocity v[k] are acquired, as shown in Expression (1). In Expression (1), the estimated position error e[k] is indicated by (y[k]−x[k]).

The estimated values x[k] and v[k] are multiplied by a state feedback gain (−Fa=F1, F2) in a fourth computing block 48, and a first drive value u[k] for the actuator 1 is acquired, as shown in Expression (2). On the other hand, the estimated values x[k] and v[k] of Expression (1) from an addition block 44 are multiplied by an estimated gain Aa (2×2 matrix (1, 0) in Expression (4)) in a fifth computing block 52.

The drive value u[k] in the fourth computing block 48 is multiplied by an estimated gain Ba (a value by which u[k] in Expression (4) is multiplied) in a sixth computing block 50. Both of the multiplication results are added in an addition block 54, and estimated state quantities x[k+1] and v[k+1] of the next sample in Expression (4) are acquired.

The estimated state quantity of the next sample is input to a delay block 46, and is corrected with the estimated correction value in the state estimation block 42. And for the estimated value of Expression (1) from the addition block 44, the estimated position x[k] is acquired in a seventh computing block 56, and is input to the second computing block 40.

In the disturbance model, on the other hand, the estimated position error e[k] is input to a state estimation block 60 of the disturbance, and an estimated correction value (right hand side of Expression (1)) is computed using estimated gains Ld1 (L3, L4, L5). And the result is added with a state quantity (left hand side of Expression (1)) from a delay block 62 in an addition block 66, and an estimated bias value b[k] and estimated disturbance suppression values z1[k] and z2[k] are acquired, as shown in Expression (1).

The estimated values b[k], z1[k] and z2[k] are multiplied by a state feedback gain (Fd1=F3, F4, F5) in an eighth computing block 68, and the disturbance suppression drive value of the actuator 1 is acquired, as shown in Expression (3).

The estimated values b[k], z1[k] and z2[k] of Expression (1) from the addition block 66, on the other hand, are multiplied by an estimated gain Ad1 (gain of b[k] of Expression (5) and gain of 2×2 matrix A) in a ninth computing block 64, the result is input to the delay block 62, and estimated values b[k+1], z1[k+1] and z2[k+1] of the next sample are acquired.

And in an addition block 70, the disturbance suppression drive value is subtracted from the drive value u[k], and an output drive value uout[k] of Expression (3) is acquired.

In other words, the estimated gain L is separated between the controller model and disturbance model, and the feedback gain F is separated between the controller model and disturbance model, so as to design the controller model and disturbance model separately. The design of the disturbance observer will be described in detail later.

Now as an input to an adaptive control system 30-1, the estimated position error e[k] of the observer is supplied. The estimated position error e[k] of the observer is a difference value between an actual position error (r−y[k]) of a computing block 40 and the estimated position x[k] of the observer.

The disturbance suppression adaptive control system has a ω estimation section 30-1 for estimating a disturbance frequency according to an adaptive rule, and a table 30-2 (32) for storing estimated gains L and A and a target gain according to an estimated frequency (angular frequency ω in this case). A ω estimation section 24 calculates an estimated angular frequency ω1[k] from an estimated error e[k] using the following adaptive Expression (6).

$$\omega 1[k] = \omega 1[k-1] + Ka \cdot \frac{L5 \cdot z1[k] - L4 \cdot z2[k]}{z1[k]^2 + z2[k]^2} e[k]. \quad (6)$$

This adaptive expression has an integration form for adaptively correcting an estimated angular frequency ω1[k−1] one sample before using estimated disturbance gains L4 and L5, estimated disturbance values z1[k] and z2[k] and estimation position error e[k]. Ka is a predetermined gain.

Based on the estimated value of the addition block 66, the estimated disturbance values z1[k] and z2[k] are acquired, and output to the ω estimation section 30-1. The ω estimation section 30-1 has a computing section for computing the second term (Ka - - - e[k] of the ω adaptive expression in Expression (6), a delay section for delaying the estimated o[k] by one sample, and an addition section for adding the delayed ω(ω[k−1]) and the computing result of the second term in the computing section. In other words, the adaptive expression of Expression (6) is computed.

A table 30-2, on the other hand, stores L1, L2, L3, L4 and L5 according to the value of the estimated disturbance frequency Fdist (estimated angular frequency ω), a11, a12, a21 and a22, and values of the target gain, as shown in FIG. 14. Based on L1, L2, L3, L4 and L5 of this table 30-2, L1, L2, L3, L4 and L5 of the state estimation blocks 42 and 60 are changed according to the estimated angular frequency. Also based on a11, a12, a21 and a22 of this table 30-2, a11, a12, a21 and a22 of the ninth computing block 64 (see Expression (5)) are changed according to the estimated angular frequency.

In other words, according to the disturbance (angular) frequency ω, the disturbance model and the estimated gain are changed, without changing the state feedback gain F. Here all the estimated gains of the observer are influenced, not only the disturbance model for shaping the frequency characteristic in a notch filter form. In other words, if the disturbance frequency ω or the disturbance model changes, not only the disturbance estimated gains L4 and L5 of Expression (1), but all of the gains L1, L2 and L3 of position, velocity and bias are influenced. Particularly this influence is major if the ζ2 value is high in the pole assignment when the disturbance model is designed in the form of a shaping filter, that is if the width of the suppression area in the notch filter form is wide in the frequency characteristic. Therefore all the estimated gains from L1 to L5 must be changed according to the disturbance frequency. The values of the estimated gains are calculated by the pole assignment method and stored in the table 30-2 in advance.

On the other hand, just like FIG. 12, the gain calibration block 34 applies a sine wave disturbance SD having a predetermined frequency according to the gain calibration instruction, detects signals in the loop before and after applying the sine wave disturbance, and calculates a gain of the gain multiplication block 26. The sine wave disturbance SD for measurement is supplied from the addition block 28 to the feedback loop for a position which is an input of the controller 20 constructed with the disturbance observer, and positions before and after applying the sine wave disturbance are observed.

Here the target gain table is integrated with the parameter table 30-2, as shown in FIG. 14. In other words, the parameter table 30-2 stores a target gain G corresponding to a disturbance frequency Fdist, supplies the target gain G corresponding to the disturbance frequency Fdist from the ω estimation section 30-1 to the gain calibration block 34, and uses it as a reference of gain calibration in the gain calibration block 34.

The present embodiment also has a switch SW for stopping the input of a position error of the controller 20 to the ω estimation section 30-1 during gain calibration. By this, the ω estimation section 30-1 maintains the estimated disturbance frequency before starting gain calibration during gain calibration. Therefore during gain calibration, the disturbance suppression control is executed, but adaptive control is interrupted so that unnecessary adaptive control is not performed by a sine wave disturbance for measuring the gain.

In this way, a desired disturbance suppression function can be easily added to the controller by constructing the controller with the disturbance observer. Also the disturbance suppression adaptive control can be easily implemented by changing the estimated gain.

FIG. 15 shows another parameter table, and FIG. 16 is a diagrams depicting the operation thereof. Compared with the table 30-2 in FIG. 14, a column of measurement frequency Fcal is created for each disturbance frequency Fdist in this table 30-2, in addition to the estimated gain and target gain. In other words, the measurement frequency can also be changed according to the disturbance frequency Fdist.

Here, as FIG. 16 shows, a frequency deviated from the disturbance frequency Fdist by α is set for the measurement frequency. Therefore the measurement frequency is shifted from the disturbance frequency without overlapping, and open loop gain can be accurately measured.

Figures 17, 18:
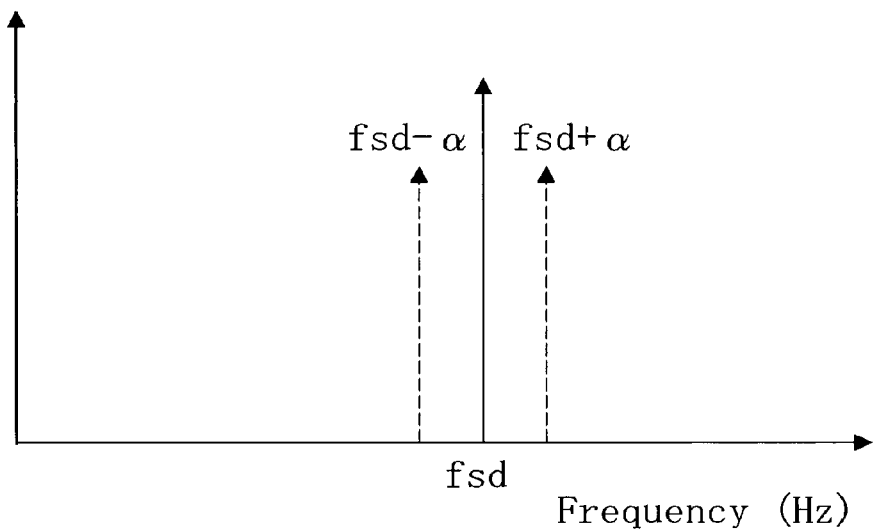
FIG. 17 shows still another parameter table of the embodiment in FIG. 13.
FIG. 18 is a diagram depicting a measurement frequency of the parameter table in FIG. 17.

FIG. 17 shows another parameter table, and FIG. 18 is a diagram depicting the operation thereof. Compared with the table 30-2 in FIG. 14, a column of measurement frequency Fcal is created for each disturbance frequency Fdist in this table 30-2, in addition to the estimated gain and target gain.

In FIG. 17, just like FIG. 11, if the disturbance frequency Fdist is the measurement frequency fsd, the measurement frequency is changed to fsd+α (α≠0) or fsd−α. Also, as FIG. 18 shows, the measurement frequency is set to be higher than the disturbance frequency Fdist (e.g. fsd+α) if the disturbance frequency is lower than this measurement frequency fsd, and if the disturbance frequency is higher than this measurement frequency fsd, the measurement frequency is set to be lower than the disturbance frequency Fdist (e.g. fsd−α).

In other words, the measurement frequency is shifted from the disturbance frequency, but if the shifting range is inappropriate, the gain calibration becomes difficult. For example, if the measurement frequency is set too low, the measurement frequency extends beyond the lower limit of the servo band, and if the measurement frequency is set high, the measurement frequency extends beyond the upper limit of the servo band, so measurement itself becomes difficult.

Therefore in an area where the disturbance frequency is low, the measurement frequency is set to higher than the disturbance frequency Fdist (e.g. fsd+α), and in an area where the disturbance frequency is high, the measurement frequency is set to lower than the disturbance frequency Fdist (e.g. fsd−α).

And in the column of the disturbance frequency Fr*K (=fsd), two measurement frequencies, (fsd+α) and (fsd−α), are set, and the corresponding target gains GK1 and GK2 are set. By this, the interpolation of the gain can be switched at the boundary.

Designing Disturbance Observer

Now the design procedure of the disturbance observer will be described. The observer control system when the actuator 1 is a double integral model is given by the following analog expression, Expression (7).

$$s\begin{pmatrix}x\\v\end{pmatrix}=\begin{pmatrix}0&1\\0&0\end{pmatrix}\begin{pmatrix}x\\v\end{pmatrix}+\frac{Bl}{m}\begin{pmatrix}0\\1\end{pmatrix}u+\begin{pmatrix}L1\\L2\end{pmatrix}(y-x) \quad (7)$$

$$y=(1\ 0)\begin{pmatrix}x\\v\end{pmatrix}$$

$$u=-(Fx\ Fv)\begin{pmatrix}x\\v\end{pmatrix}$$

In Expression (7), 's' is a Laplace operator, 'x' is an estimated position, 'v' is an estimated velocity, 'y' is a current position, 'r' is a target position, L1 and L2 are estimated gains of position and velocity respectively, 'u' is a drive current, and B1/m is a force constant of the actuator 1.

This control system has a sensitivity function 1/(1+CP), and the disturbance suppression for this sensitivity function is defined by the second degree filter in the following Expression (8).

$$\frac{s^2+2\zeta_1\omega_1 s+\omega_1^2}{s^2+2\zeta_2\omega_2 s+\omega_2^2} \quad (8)$$

The disturbance model, of which denominator is a numerator of the shaping filter, is given by the following Expression (9).

$$\frac{1}{s^2+2\zeta_1\omega_1 s+\omega_1^2} \quad (9)$$

There are three possible methods to set up this disturbance model in the observer of the original controller (Expression (7)).

The first method is setting up the disturbance model in Expression (9) as is. In other words, this is a second degree filter, so if the estimated state quantities of a disturbance are z1 and z2, and the estimated gains of disturbance are L3 and L4, the observer control system is expression by Expression (10).

$$s\begin{pmatrix}x\\v\\z1\\z2\end{pmatrix}=\begin{pmatrix}0&1&0&0\\0&0&1&0\\0&0&0&1\\0&0&-\omega_1^2&-2\zeta_1\omega_1\end{pmatrix}\begin{pmatrix}x\\v\\z1\\z2\end{pmatrix}+\frac{Bl}{m}\begin{pmatrix}0\\1\\0\\0\end{pmatrix}u+\begin{pmatrix}L1\\L2\\L3\\L4\end{pmatrix}(y-x) \quad (10)$$

$$y=(1\ 0\ 0\ 0)\begin{pmatrix}x\\v\\z1\\z2\end{pmatrix}$$

$$u=-(Fx\ Fv\ K\ 0)\begin{pmatrix}x\\v\\z1\\z2\end{pmatrix}$$

$$K=\frac{m}{Bl}$$

The second method is dispersing the term of the square of ω1, and Expression (11) is acquired by transforming Expression (10).

$$s\begin{pmatrix}x\\v\\z1\\z2\end{pmatrix}=\begin{pmatrix}0&1&0&0\\0&0&1&0\\0&0&0&\omega_1\\0&0&-\omega_1&-2\zeta_1\omega_1\end{pmatrix}\begin{pmatrix}x\\v\\z1\\z2\end{pmatrix}+\frac{Bl}{m}\begin{pmatrix}0\\1\\0\\0\end{pmatrix}u+\begin{pmatrix}L1\\L2\\L3\\L4\end{pmatrix}(y-x) \quad (11)$$

$$y=(1\ 0\ 0\ 0)\begin{pmatrix}x\\v\\z1\\z2\end{pmatrix}$$

$$u=-(Fx\ Fv\ K\ 0)\begin{pmatrix}x\\v\\z1\\z2\end{pmatrix}$$

$$K=\frac{m}{Bl}$$

The third method is inverting the sign of col in Expression (11), and is given by Expression (12).

$$s\begin{pmatrix}x\\v\\z1\\z2\end{pmatrix}=\begin{pmatrix}0&1&0&0\\0&0&1&0\\0&0&0&-\omega_1\\0&0&\omega_1&-2\zeta_1\omega_1\end{pmatrix}\begin{pmatrix}x\\v\\z1\\z2\end{pmatrix}+\frac{Bl}{m}\begin{pmatrix}0\\1\\0\\0\end{pmatrix}u+\begin{pmatrix}L1\\L2\\L3\\L4\end{pmatrix}(y-x) \quad (12)$$

$$y=(1\ 0\ 0\ 0)\begin{pmatrix}x\\v\\z1\\z2\end{pmatrix}$$

$$u=-(Fx\ Fv\ K\ 0)\begin{pmatrix}x\\v\\z1\\z2\end{pmatrix}$$

$$K=\frac{m}{Bl}$$

Design is possible by any of these methods. The second and third methods are effective particularly when the model is transformed into a digital control system. In other words, the two state variables z1 and z2 are balanced, and the values of the estimated gains L3 and L4 of the observer for the two state variables are not very far apart.

At this time, the values of the estimated gains L1, L2, L3 and L4 are designed by specifying the poles combining the pole of the shaping filter of Expression (8) (derived from denominator=0 in Expression (8)) and the poles used for designing the original observer control system.

The observer control system combining the second degree filter shaping and the conventional steady state bias estimation is given by the following Expression (13).

$$s\begin{pmatrix}x\\v\\b\\z1\\z2\end{pmatrix}=\begin{pmatrix}0&1&0&0&0\\0&0&1&0&0\\0&0&0&0&0\\0&0&0&0&\omega_1\\0&0&0&-\omega_1&-2\zeta_1\omega_1\end{pmatrix}\begin{pmatrix}x\\v\\b\\z1\\z2\end{pmatrix}+\frac{Bl}{m}\begin{pmatrix}0\\1\\0\\0\\0\end{pmatrix}u+\begin{pmatrix}L1\\L2\\L3\\L4\\L5\end{pmatrix}(y-x) \quad (13)$$

$$y=(1\ 0\ 0\ 0\ 0)\begin{pmatrix}x\\v\\b\\z1\\z2\end{pmatrix}$$

$$u=-(Fx\ Fv\ K\ K\ 0)\begin{pmatrix}x\\v\\b\\z1\\z2\end{pmatrix}$$

$$K=\frac{m}{Bl}$$

In this way, the filter form for shaping is considered first, then the disturbance model is added to the observer in designing. Therefore forms can be freely shaped without being limited by the physical response characteristic of the original disturbance model.

Thus far description dealt with analog design. But in order to design a digital control system, on the other hand, the disturbance model is created in an analog space and an enlarged model is constructed, then after the enlarged model is transformed (digitized) in the digital space, the pole assignment is specified in the digital space.

When the disturbance model has the characteristic of the second degree filter, if the enlarged model is transformed into a discrete system, both of the two variables z1 and z2 of the disturbance model in matrix A for designing the estimated gain of the observer influence the actuator 1.

Therefore correction is made so that only one of the variables of the disturbance model influences the actuator 1, more specifically, so that only a variable, the same as that of analog design, influences the actuator 1. In other words, after digitizing, the enlarged model is corrected.

Specifically, when the analog model in the form of Expression (11), using the second degree filter, is digitized (that is z-transformation is performed and the result is converted into SI units), the following Expression (14) is established.

$$z\begin{pmatrix}x[k]\\v[k]\\z1[k]\\z2[k]\end{pmatrix}=\begin{pmatrix}1&T&A13&A14\\0&1&A23&A24\\0&0&A33&A34\\0&0&A43&A44\end{pmatrix}\begin{pmatrix}x[k]\\v[k]\\z1[k]\\z2[k]\end{pmatrix}+\frac{Bl}{m}\begin{pmatrix}T^2/2\\T\\0\\0\end{pmatrix}u[k] \quad (14)$$

$$y=(1\ 0\ 0\ 0)\begin{pmatrix}x[k]\\v[k]\\z1[k]\\z2[k]\end{pmatrix}$$

In Expression (14), z is a Z transformer and T is a sampling cycle. Here matrix A, that is A13, A14, A23 and A24, is focused on. Neither A14 nor A24 become "0" merely by digitizing. In other words, both of the two variables z1 and z2 of the disturbance model in matrix A for designing the estimated gain of the observer influence the actuator 1.

Therefore after digitizing the analog model, coefficients with which the state variables z1 and z2 of the disturbance model in matrix A influence the actuator 1, are replaced.

In the case of the examples of Expression (14), matrix A is corrected as the following Expression (15).

$$\left.\begin{array}{l} A14 = A24 = 0 \\ A13 = T^2/2 \\ A23 = T \end{array}\right\} \quad (15)$$

In the digital control system, the unit of distance is a track, the current value is normalized with the maximum current as "1", and the velocity and acceleration are not in second units, but must be normalized by a sampling frequency.

In the same way, if the observer in analog format in Expression (13) is transformed into the format of the current observer, Expression (16) is established.

$$\left.\begin{array}{l}
\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \\
u(k) = -(F1\ F2\ F3\ F4\ F5) \begin{pmatrix} x(k) \\ v(k) \\ b(k) \\ z1(k) \\ z2(k) \end{pmatrix} \\
\begin{pmatrix} x(k+1) \\ v(k+1) \\ b(k+1) \\ z1(k+1) \\ z2(k+1) \end{pmatrix} = \begin{pmatrix} 1 & 1 & 1/2 & 1/2 & 0 \\ 0 & 1 & 1 & 1 & 0 \\ 0 & 0 & 1 & 0 & 0 \\ 0 & 0 & 0 & a11 & a12 \\ 0 & 0 & 0 & a21 & a22 \end{pmatrix} \begin{pmatrix} x(k) \\ v(k) \\ b(k) \\ z1(k) \\ z2(k) \end{pmatrix} + \frac{Bl}{m}\frac{1}{Lp}T^2 \begin{pmatrix} 1/2 \\ 1 \\ 0 \\ 0 \\ 0 \end{pmatrix} u(k)
\end{array}\right\} \quad (16)$$

In this way, if the disturbance model is designed to be a separate configuration, Expression (16) can be set up with the disturbance model separately, as shown in FIG. 12.

In other words, in the comparison of Expression (16) with Expression (1) to Expression (5), Expressions (2) and (4) are Expression (16), wherein the model of the controller is independent, and Expression (3) and (5) are Expression (16), wherein the disturbance model 50 is separated.

Fourth Embodiment

Figure 19:
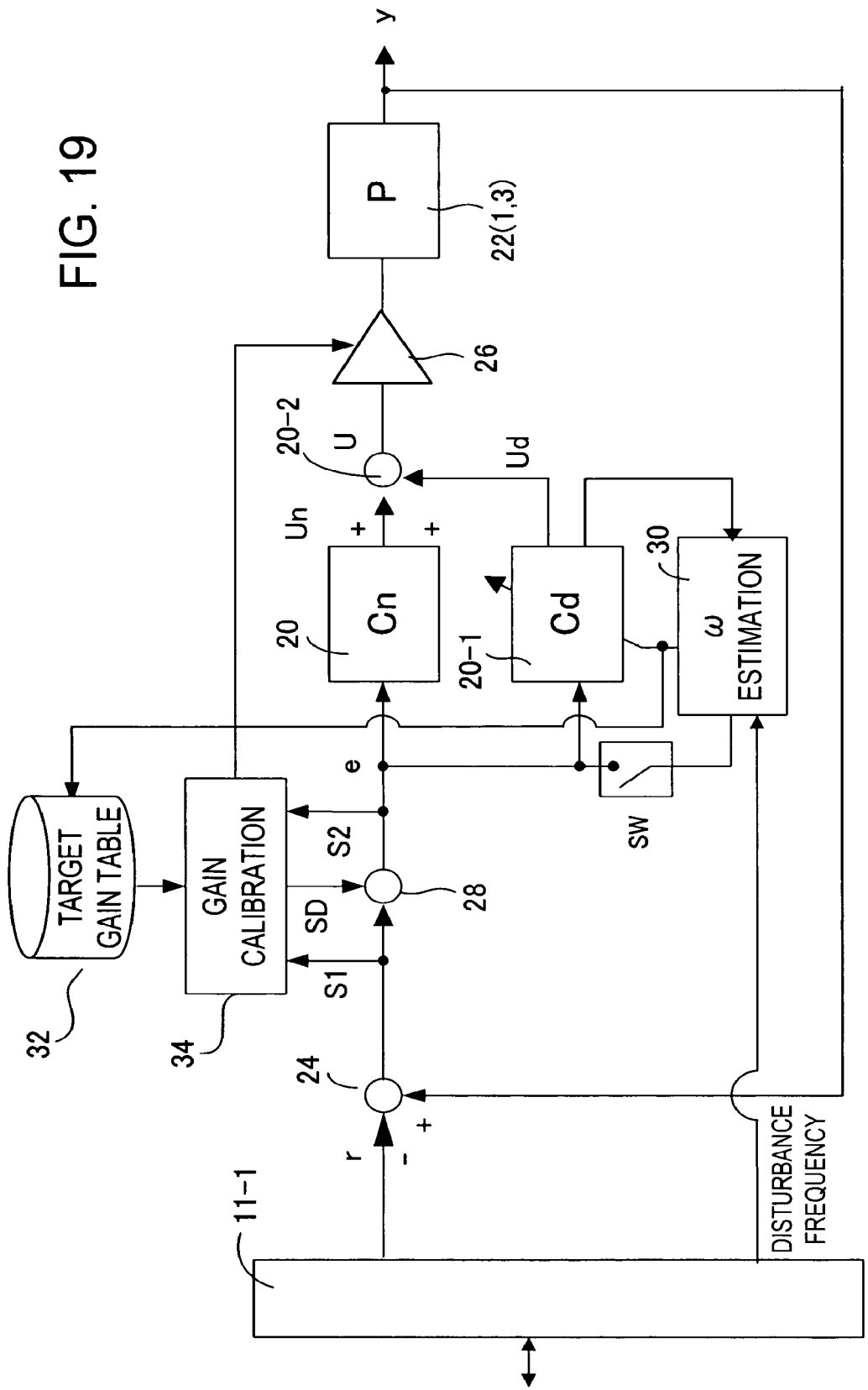
FIG. 19 is a block diagram depicting a position control system according to the fourth embodiment of the present invention.

FIG. 19 is a block diagram depicting the fourth embodiment of the position control system for suppressing disturbance which the MCU 14 in FIG. 1 executes. This position control system is a control system for detecting a disturbance frequency and suppressing the sine wave disturbance having a predetermined frequency. In FIG. 19, composing elements the same as those in FIG. 4 are denoted with the same reference symbols.

A position error e between a target position r supplied from an interface circuit 11-1 (in HDC 11) and an observation position y is computed in a computing unit 24. This position error e is input to a controller 20 (Cn) which performs feedback control. The controller 20 outputs a control current value Un by a known PID control, PI control+LeadLag, and observer control.

A frequency estimation unit (ω estimation) 30 for estimating the frequency of disturbance, and a compensator (Cd) 20-1 for suppressing the disturbance having a specific frequency by adaptive control, are added to this controller 20.

A sum U of an output Un of the controller 20 (Cn) and an output Ud of the compensator 20-1 (Cd) is determined in an addition block 20-2, and is supplied to a plant 22 (1, 3) via a gain multiplication block 26. By this, the position of the head 3 driven by the actuator 1, which is the control target 22, is controlled so as to follow up the disturbance. In other words, the device is vibrated by the distance, so the position of the head 3, with respect to the magnetic disk 4, is also controlled to follow up the disturbance, so the position relationship of the head 3 and the magnetic disk 4 does not change.

This frequency estimation unit 30 estimates an angular frequency ω (=2πf) of the disturbance based on a position error e, as shown in FIG. 12, and supplies it to the transfer function of the disturbance frequency suppression of the compensator 20-1. The compensator 20-1 calculates the recurrence formula (adaptive control expression) of the sine wave based on the position error e and this estimated angular frequency ω, and a compensating current output Ud is calculated.

In this way, in order to handle disturbance with an unknown frequency in a certain range, the frequency of disturbance is detected and the unknown frequency is suppressed. As a method for estimating an unknown frequency and suppressing disturbance of the unknown frequency, assuming the recurrent formula of a sine wave, or the above mentioned method of supplying adaptive rule based on the error signal e and correcting the drive quantity of the control target, can be used. Also a method of estimating an unknown frequency based on an error signal e, generating a disturbance suppression signal on the position level, correcting the error signal, and inputting it into the controller, can also be used.

Here the interface circuit 11-1 receives a disturbance suppression frequency from the outside, and sets it in the frequency estimation unit 30 as an initial value of the frequency estimation unit 30 (initial value of the angular frequency of disturbance). Therefore the compensator 20-1 performs adaptive control from this initial value.

In other words, the initial value of the frequency estimation unit 30, which is normally based on the assumption that the disturbance frequency is unknown, is set at the center of the follow up range, with a position error e, and gradually reaches the disturbance frequency, but in the present embodiment, a known disturbance frequency is set as the initial value, so position control starts directly with the known disturbance frequency, and even if the frequency changes thereafter, the estimated frequency follows up from there.

In this position control system where disturbance frequency is set from the outside, a gain calibration block 34 and a target gain table 32 are installed. The gain calibration block 34 applies a sine wave disturbance SD having a predetermined frequency according to a gain calibration instruction, detects signals in a loop before and after applying in the sine wave disturbance, and calibrates the gain of the gain multiplication block 26. In FIG. 19, the sine wave disturbance SD for measurement is supplied from the addition block 28 to the feedback loop according to a position which is an input of the controller, and positions before and after applying the sine wave disturbance are observed.

The target gain table 32 stores a target gain G corresponding to a disturbance frequency Fdist, supplies the target gain G corresponding to the disturbance frequency Fdist from the ω estimation section 30 to the gain calibration block 34, and uses it as a reference of gain calibration in the gain calibration block 34.

The present embodiment also has a switch SW for stopping the input of a position error to the ω estimation section 30 during gain calibration. By this, the ω estimation section 30 maintains the estimated disturbance frequency before starting gain calibration during gain calibration. Therefore during gain calibration, the distance suppression control is executed, but adaptive control is interrupted so that unnecessary adaptive control is not performed by a sine wave disturbance for measuring the gain.

In this way, the present invention can also be applied to the position control system where disturbance frequency is set from the outside.

Fifth Embodiment

Figure 20:
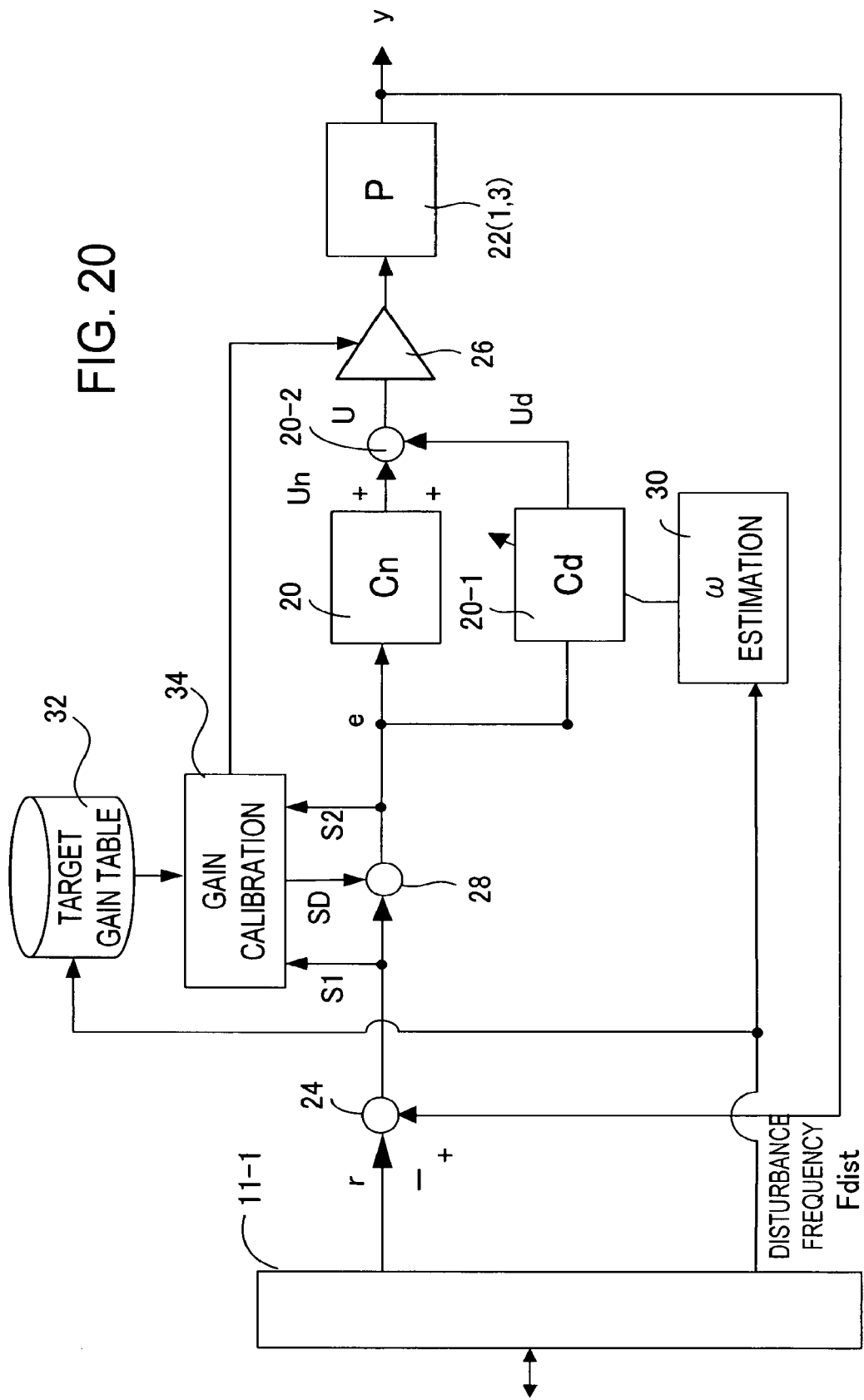
FIG. 20 is a block diagram depicting a position control system according to the fifth embodiment of the present invention.

FIG. 20 is a block diagram depicting the fifth embodiment of a position control system for suppressing disturbance which the MCU 14 in FIG. 1 executes. This position control system is a control system for detecting a disturbance frequency and suppressing sine wave disturbance having a predetermined frequency. In FIG. 20, composing elements the same as those in FIG. 4, FIG. 12 and FIG. 19 are denoted with the same reference symbols.

In FIG. 20, a position error e between a target position r supplied from an interface circuit 11-1 (in HDC 11) and an observation position y is computed in a computing unit 24. This position error e is input to a controller 20 (Cn) which performs feedback control. The controller 20 outputs a control current value Un by a known PID control, PI control+ LeadLag, and observer control.

A frequency converter 30 for converting a frequency of disturbance to a corresponding angular frequency, and a compensator (Cd) 20-1 for suppressing disturbance having a specific frequency by adaptive control are added to this controller 20.

A sum U of an output Un of the controller 20 (Cn) and an output Ud of the compensator 20-1 (Cd) is supplied to a plant 22 (1, 3) via an addition block 20-2 and a gain multiplication block 26. By this, position of the head 3 driven by the actuator 1, which is the control target 22, is controlled so as to follow up the disturbance. In other words, the device is vibrated by the disturbance, so the position of the head 3 with respect to the magnetic disk 4 is also controlled to follow up the disturbance, and the position relationship of the head 3 and the magnetic disk 4 does not change.

This frequency converter 30 supplies an angular frequency ω (=2πf) to a transfer function of the disturbance frequency suppression of the compensator 20-1. The compensator 20-1 calculates the recurrence formula (adaptive control expression) of the sine wave based on the position error e and this estimated angular frequency ω, and a compensating current output Ud is calculated.

In this way, in order to handle disturbance with a frequency in a certain range, disturbance frequency which changes is suppressed according to the frequency of disturbance. As this method, assuming a recurrence formula of a sine wave, or the above mentioned method of introducing an adaptive rule based on the error signal e and correcting the drive quantity of the control target, can be used. Also a method of estimating an unknown frequency based on an error signal 'e', generating a disturbance suppression signal on the position level, correcting the error signal, and inputting it into the controller, can also be used.

In the present embodiment, the interface circuit 11-1 receives a disturbance suppression frequency from the outside, and sets it in the frequency converter 30. Therefore the compensator 20-1 performs adaptive control from this initial value (angular frequency).

Since a known disturbance frequency is set as an initial value, position control starts directly with the known disturbance frequency, and even if the frequency changes thereafter, the compensating current Ud of the compensator 20-1 follows up from there.

In this way, this position control system has a means of changing an internal constant (angular frequency in the case of FIG. 5 and FIG. 6), or the configuration according to the set value of the disturbance frequency to be selectively suppressed, and the disturbance frequency can be referred to or set from the outside via the interface 11-1.

Other Embodiment

In the above embodiments, the position control device was described using an example of a head positioning device of a magnetic disk device, but the present invention can also be applied to other medium storage devices, such as an optical disk device or other devices to control the position of an object. The number of disturbance frequencies can be arbitrary according to necessity, and the number of disturbance models to be used can be arbitrary accordingly. The embodiments were described using a second degree filter, but a first degree filter or a combination of a first degree filter and a second degree filter may be used according to the frequency which need be suppressed.

The present invention was described using embodiments, but the present invention can be modified in various ways within the scope of the essential character thereof, and these variant forms shall not be excluded from the scope of the present invention.

Because of disturbance suppression control, open loop gain is calibrated using a target gain according to a disturbance frequency even if a loop characteristics of a feedback controller changes, so the open loop gain can be calibrated without interrupting the disturbance suppression control. Therefore the open loop gain can be accurately calibrated without being affected by disturbance, and accurate position control is possible.

What is claimed is:

1. A position control method for controlling a position of an object to a predetermined position by an actuator, the position control method comprising:

suppressing a disturbance based on a feedback loop predefined for multiplying a drive instruction value by a gain as calibrating a loop gain being a gain of a loop characteristic that varies according to a change in characteristics of elements constituting the feedback loop, the drive instruction value being used for correcting a position error between a current position of the object and a target position of the object before and after application of a sine wave disturbance having a predetermined frequency to zero;

estimating an angular frequency of disturbance based on the position error; and stopping estimating the angular frequency of disturbance when the loop gain is calibrated and maintaining an angular frequency of disturbance estimated before the loop gain is calibrated.

2. The position control method according to claim 1, wherein the stopping comprises cutting input of the position error used in the estimating upon calibrating the loop gain.

3. A position control device configured to control a position of an object to a predetermined position by an actuator, the position control device comprising:

a control unit configured to suppress a disturbance based on a feedback loop predefined for multiplying a drive instruction value by a gain while calibrating a loop gain being a gain of a loop characteristic that varies according to a change in characteristics of elements constituting the feedback loop, the drive instruction value being used for correcting a position error between a current position of the object and a target position of the object before and after application of a sine wave disturbance having a predetermined frequency to zero, the control unit comprising:

an estimation unit configured to estimate an angular frequency of disturbance based on the position error, and an estimation stop unit configured to stop estimating the angular frequency of disturbance when the loop gain is calibrated and maintain an angular frequency of disturbance estimated before the loop gain is calibrated.

4. The position control device according to claim 3, wherein the estimation stop unit is configured to cut input of the position error used in estimating the angular frequency of disturbance by a switch upon calibrating the loop gain.

5. A medium storage device, comprising;

a head configured to at least read data from a storage medium;

an actuator configured to position the head to a predetermined position on the storage medium; and a control unit configured to suppress a disturbance based on a feedback loop predefined for multiplying a drive instruction value by a gain while calibrating a loop gain being a gain of a loop characteristic that varies according to a change in characteristics of elements constituting the feedback loop, the drive instruction value being used for correcting a position error between a current position of the head and a target position of the head before and after application of a sine wave disturbance having a predetermined frequency to zero, the control unit comprising:

an estimation unit configured to estimate an angular frequency of disturbance based on the position error, and an estimation stop unit configured to stop estimating the angular frequency of disturbance when the loop gain is calibrated and maintain an angular frequency of disturbance estimated before the loop gain is calibrated.

6. The medium storage device according to claim 5, wherein the estimation stop unit is configured to cut input of the position error used in estimating the angular frequency of disturbance by a switch upon calibrating the loop gain.

* * * * *